US012164583B2

(12) United States Patent
Kim et al.

(10) Patent No.: US 12,164,583 B2
(45) Date of Patent: Dec. 10, 2024

(54) METHOD AND DEVICE FOR PROVIDING USER-CUSTOMIZED INFORMATION

(71) Applicant: Samsung Electronics Co., Ltd., Suwon-si (KR)

(72) Inventors: Hang-kyu Kim, Seongnam-si (KR); Chi-hyun Park, Seoul (KR); Hae-dong Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 509 days.

(21) Appl. No.: 16/804,589

(22) Filed: Feb. 28, 2020

(65) Prior Publication Data

US 2020/0201926 A1     Jun. 25, 2020

Related U.S. Application Data

(63) Continuation of application No. 15/112,000, filed as application No. PCT/KR2015/000563 on Jan. 20, 2015, now Pat. No. 10,628,508.

(30) Foreign Application Priority Data

Jan. 20, 2014  (KR) .................. 10-2014-0006738

(51) Int. Cl.
  *G06F 16/90*   (2019.01)
  *G06F 16/9537* (2019.01)
  *H04W 4/029*   (2018.01)

(52) U.S. Cl.
  CPC ........ *G06F 16/9537* (2019.01); *H04W 4/029* (2018.02)

(58) Field of Classification Search
  None
  See application file for complete search history.

(56) References Cited

U.S. PATENT DOCUMENTS 6,356,836 B1 *  3/2002  Adolph ............. G01C 21/3819
                                                   701/410
7,079,048 B2    7/2006  Kataoka
                  (Continued)

FOREIGN PATENT DOCUMENTS

JP         200526738 A     1/2005
KR    10-20080069077 A     7/2008
              (Continued)

OTHER PUBLICATIONS

Chon et al.; Automatically Characterizing Places with Opportunistic CrowdSensing using Smartphones; UbiComp '12; Sep. 5-8, 2012; Pittsburgh, PA.

(Continued)

*Primary Examiner* — Belix M Ortiz Ditren
(74) *Attorney, Agent, or Firm* — Sughrue Mion, PLLC

(57) ABSTRACT

A method for providing user-customized information is disclosed. The method for providing user-customized information can provide information suitable for a user's situation by: obtaining information on a location where a terminal is located, and information on the time when the location information was obtained; obtaining situation information of a user of the terminal predicted on the basis of the location information and the time information; and requesting, to a server, situation-adaptive information corresponding to the user's situation on the basis of the obtained situation information of the user, pre-stored profile information of the user, and state information of the terminal at a time when the location information is obtained so as to obtain the situation-adaptive information from the server.

18 Claims, 9 Drawing Sheets

(56) References Cited

U.S. PATENT DOCUMENTS

| | | | |
|---|---|---|---|
| 7,376,509 B2* | 5/2008 | Endo | G08G 1/0104 340/995.13 |
| 2003/0216143 A1* | 11/2003 | Roese | H04W 4/20 455/456.2 |
| 2004/0088107 A1* | 5/2004 | Seligmann | G01C 21/36 709/224 |
| 2006/0089792 A1 | 4/2006 | Manber et al. | |
| 2006/0156209 A1* | 7/2006 | Matsuura | G06Q 10/10 714/E11.207 |
| 2010/0131335 A1* | 5/2010 | Roh | G06F 16/9535 707/E17.014 |
| 2011/0087685 A1 | 4/2011 | Lin et al. | |
| 2012/0084248 A1* | 4/2012 | Gavrilescu | G06F 16/9535 706/54 |
| 2012/0150444 A1* | 6/2012 | Hong | G01C 21/3461 701/400 |
| 2012/0150529 A1 | 6/2012 | Kim et al. | |
| 2013/0110823 A1 | 5/2013 | Su et al. | |
| 2013/0173346 A1 | 7/2013 | Odawara et al. | |
| 2013/0173389 A1 | 7/2013 | Page et al. | |
| 2014/0189036 A1* | 7/2014 | Bhatia | H04L 47/25 709/224 |
| 2015/0112792 A1 | 4/2015 | Kim | |

FOREIGN PATENT DOCUMENTS

| | | |
|---|---|---|
| KR | 10-20110032394 A | 3/2011 |
| KR | 10-2011-0065860 A | 6/2011 |
| KR | 10-20120089502 A | 8/2012 |
| KR | 10-1186443 B1 | 9/2012 |
| KR | 10-20120111592 A | 10/2012 |
| KR | 10-2013-0033492 A | 4/2013 |
| KR | 10-2013-0088656 A | 8/2013 |

OTHER PUBLICATIONS

Korean Notice of Allowance dated Jul. 24, 2020, issued in Korean Patent Application No. 10-2014-0006738.
Communication dated Oct. 29, 2021, issued by the Korean Intellectual Property Office in Korean Application No. 10-2021-0126541.
Communication dated Jun. 24, 2021 issued by the Korean Intellectual Property Office in Korean Application No. 10-2020-0139761.
Korean Office Action, dated Nov. 4, 2022, issued by the Koran Patent Office, in App No. 10-2022-0092066.
KR Communication issued Apr. 3, 2023 from the Korean Intellectual Property Office in KR Patent Application No. 10-2022-0092066.

* cited by examiner

METHOD AND DEVICE FOR PROVIDING USER-CUSTOMIZED INFORMATION

CROSS-REFERENCE TO RELATED APPLICATION(S)

This application is a continuation application of prior application Ser. No. 15/112,000, filed on Jul. 15, 2016, which was a U.S. National Stage application under 35 U.S.C. § 371 of an International application number PCT/KR2015/000563, filed on Jan. 20, 2015, which is based on and claimed priority of a Korean patent application number 10-2014-0006738, filed on Jan. 20, 2014, in the Korean Intellectual Property Office, the disclosure of which is incorporated by reference herein in its entirety.

TECHNICAL FIELD

The disclosed invention relates to a method and apparatus for providing user-customized information, and more particularly, to a method and apparatus for providing, by a terminal or a server, information to a user, based on a situation of the user.

BACKGROUND ART

Recently, as electronic devices advance rapidly, electronic devices capable of wireless voice call and information exchange have become the basic essentials of life. Electronic devices were recognized as portable devices simply capable of wireless call at an initial popularization stage. However, as relevant technology advances and wireless Internet is introduced, electronic devices have advanced into multimedia devices for performing functions such as scheduling, games, remote controllers, image capture, etc., instead of portable devices simply capable of wireless call and thus are satisfying desires of users.

Particularly, electronic devices for providing location information of a user or the like are being released recently. As the electronic devices provide the location information, applications for providing various pieces of information to a user based on the location information are also being released. However, in a case of providing information to a user by using only location information, since it is not easy to concretely check a situation of a user, it is difficult to substantially provide information appropriate for the situation of the user.

DETAILED DESCRIPTION OF THE INVENTION

Technical Problem

One or more embodiments include a method and apparatus for providing information more appropriate for a situation of a user, based on various pieces of information such as time information and state information of an electronic device in addition to location information obtainable by an electronic device.

Technical Solution

A method of providing user-customized information according to an embodiment of the disclosed invention includes: transmitting location information about a location, at which a terminal is located, and time information about a time, when the location information is obtained, to a server; obtaining situation information of the user of the terminal, predicted based on the location information and the time information, from the server; requesting situation-adaptive information corresponding to a situation of the user from the server, based on the obtained situation information of the user, pre-stored profile information of the user, and state information of the terminal at a time when the location information is obtained; and obtaining the situation-adaptive information from the server.

Advantageous Effects of the Invention

Information more appropriate for a situation of a user is provided based various pieces of information obtainable by an electronic device.

BEST MODE

Figure 1:
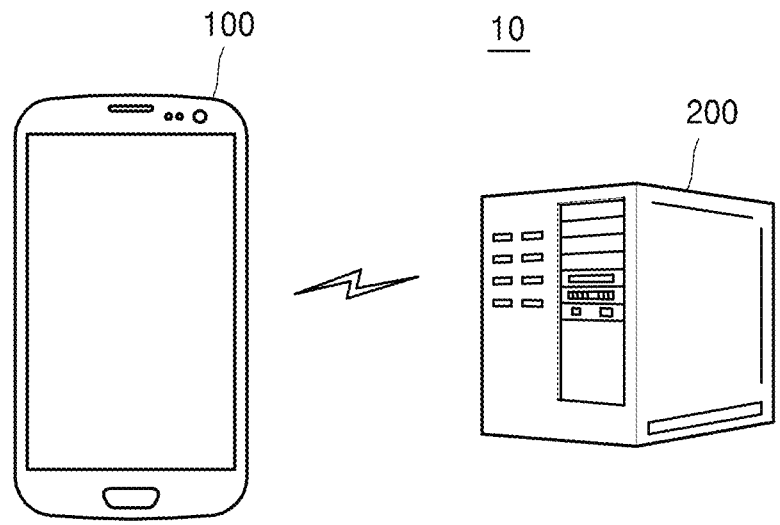
FIG. 1 is a diagram illustrating a system for providing user-customized information, according to an embodiment of the disclosed invention.

A method of providing user-customized information according to an embodiment of the disclosed invention may include transmitting location information about a location, at which a terminal is located, and time information about a time, when the location information is obtained, to a server; obtaining situation information of the user of the terminal, predicted based on the location information and the time information, from the server; requesting situation-adaptive information corresponding to a situation of the user from the server, based on the obtained situation information of the user, pre-stored profile information of the user, and state information of the terminal at a time when the location information is obtained; and obtaining the situation-adaptive information from the server.

In the method of providing user-customized information according to an embodiment of the disclosed invention, the requesting of the situation-adaptive information may include: predicting an intention of the user in a situation of the user, based on the profile information of the user and the state information of the terminal; and determining the situation-adaptive information necessary for realizing the predicted intention of the user.

In the method of providing user-customized information according to an embodiment of the disclosed invention, the requesting of the situation-adaptive information may include: generating a query from which the situation-adaptive information is capable of being extracted; and transmitting the generated query to the server.

The method of providing user-customized information according to an embodiment of the disclosed invention may further include obtaining the location information and the time information, based on a predetermined time interval.

The method of providing user-customized information according to an embodiment of the disclosed invention may further include, if first location information obtained at a first time does not correspond to second location information obtained after the first time or first time information obtained at the first time does not correspond to second time information obtained after the first time, transmitting the second location information and the second time information to the server.

A method of providing user-customized information according to an embodiment of the disclosed invention may include: receiving location information about a location at which a terminal is located and time information about a time, when the location information is obtained, from the terminal; transmitting situation information of a user of the terminal, determined based on the location information and the time information, to the terminal; receiving a request for situation-adaptive information, corresponding to a situation of the user, from the terminal; and transmitting situation-adaptive information, extracted from situation pattern information obtained by classifying, based on a predetermined time interval, at least one piece of location information obtained from the terminal and time information about a time when the at least one piece of location information is obtained, to the terminal.

In the method of providing user-customized information according to an embodiment of the disclosed invention, the transmitting of the situation information may include predicting a situation of the user, based on the location information and the time information.

In the method of providing user-customized information according to an embodiment of the disclosed invention, the predicting of the situation information may include: if the location information is location information obtained a predetermined number of times or more, predicting the situation of the user, based on location information, obtained in a first period before a time when the location information is obtained, and time information obtained in the first period; and if the location information is location information obtained less than the predetermined number of times, predicting the situation of the user, based on location information, obtained in a second period before a time when the location information is obtained, and time information obtained in the second period, wherein the first period may be set as a period which is relatively shorter than the second period.

The method of providing user-customized information according to an embodiment of the disclosed invention may further include: extracting information, repeated based on a certain time interval, from among the at least one piece of location information and the at least one piece of time information obtained from the terminal; and generating the situation pattern information, based on the extracted information.

The method of providing user-customized information according to an embodiment of the disclosed invention may further include predicting the situation of the terminal, based on at least one piece of reference location information obtained from at least one other terminal and at least one piece of reference time information about a time, when the at least one piece of reference location information is obtained.

A terminal for providing user-customized information according to an embodiment of the disclosed invention may include: a transmitter configured to transmit location information about a location, at which the terminal is located, and time information about a time, when the location information is obtained, to a server; a receiver configured to obtain situation information of the user of the terminal, predicted based on the location information and the time information, from the server; and a controller configured to request situation-adaptive information corresponding to a situation of the user from the server, based on the obtained situation information of the user, pre-stored profile information of the user, and state information of the terminal at a time when the location information is obtained, wherein the receiver obtains the situation-adaptive information from the server.

In the terminal according to an embodiment of the disclosed invention, the controller may predict an intention of the user in a situation of the user, based on the profile information of the user and the state information of the terminal and may determine the situation-adaptive information necessary for realizing the predicted intention of the user.

In the terminal according to an embodiment of the disclosed invention, the controller may generate a query from which the situation-adaptive information is capable of being extracted, and may transmit the generated query to the server.

The terminal according to an embodiment of the disclosed invention may further include a sensor unit configured to obtain the location information and the time information, based on a predetermined time interval.

In the terminal according to an embodiment of the disclosed invention, if first location information obtained at a first time does not correspond to second location information obtained after the first time or first time information obtained at the first time does not correspond to second time information obtained after the first time, the transmitter may transmit the second location information and the second time information to the server.

A server for providing user-customized information according to an embodiment of the disclosed invention may include: an obtainer configured to receive location information about a location at which a terminal is located and time information about a time, when the location information is obtained, from the terminal; a transmitter configured to transmit situation information of a user of the terminal, determined based on the location information and the time information, to the terminal; and a controller configured to extract situation-adaptive information from situation pattern information obtained by classifying, based on a predetermined time interval, at least one piece of location information obtained from the terminal and time information about a time when the at least one piece of location information is obtained, wherein the obtainer receives a request for situation-adaptive information, corresponding to a situation of the user, from the terminal.

In the server according to an embodiment of the disclosed invention, the controller may predict a situation of the user, based on the location information and the time information.

In the server according to an embodiment of the disclosed invention, if the location information is location information obtained a predetermined number of times or more, the controller may predict the situation of the user, based on location information, obtained in a first period before a time when the location information is obtained, and time information obtained in the first period, and if the location information is location information obtained less than the predetermined number of times, the controller may predict the situation of the user, based on location information, obtained in a second period before a time when the location information is obtained, and time information obtained in the second period. Also, the first period may be set as a period which is relatively shorter than the second period.

In the server according to an embodiment of the disclosed invention, the controller may extract information, repeated based on a certain time interval, from among the at least one piece of location information and the at least one piece of time information obtained from the terminal and generates the situation pattern information, based on the extracted information.

In the server according to an embodiment of the disclosed invention, the controller may predict the situation of the terminal, based on at least one piece of reference location information obtained from at least one other terminal and at least one piece of reference time information about a time, when the at least one piece of reference location information is obtained.

MODE OF THE INVENTION

Hereinafter, exemplary embodiments will be described in detail to be easily embodied by those of ordinary skill in the art with reference to the accompanying drawings. The inventive concept may, however, be embodied in many different forms and should not be construed as being limited to the embodiments set forth herein. In the accompanying drawings, a portion irrelevant to a description of the inventive concept will be omitted for clarity. Moreover, like reference numerals refer to like elements throughout.

In this disclosure below, when one part (or element, device, etc.) is referred to as being 'connected' to another part (or element, device, etc.), it should be understood that the former may be 'directly connected' to the latter, or 'electrically connected' to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

Hereinafter, the disclosed invention will be described in detail with reference to the accompanying drawings.

FIG. 1 is a diagram illustrating a system 10 for providing user-customized information, according to an embodiment of the disclosed invention.

In the system 10 for providing user-customized information illustrated in FIG. 1, only elements relevant to the present embodiment are illustrated. Therefore, it can be understood by those of ordinary skill in the art that the system 10 may further include other general-use elements in addition to the elements illustrated in FIG. 1.

Referring to FIG. 1, the system 10 for providing user-customized information may include a terminal 100 and a server 200.

The terminal 100 according to an embodiment of the disclosed invention may include at least one sensor. The terminal 100 may obtain location information of the terminal 100 by using the at least one sensor. Here, the location information may be information about a location at which the terminal 100 is located. The terminal 100 may determine the location information of the terminal 100, based on geographic information, weather information, temperature information, humidity information, illuminance information, noise information, sound information, and/or the like obtained from the sensor. This is merely an embodiment of the disclosed invention, and information which the user obtains from the sensor is not limited thereto.

The terminal 100 may obtain time information about a time when the terminal 100 obtains the location information, along with the location information. For example, the terminal 100 may obtain time information about a time when the terminal 100 obtains at least one of the geographic information, the weather information, the temperature information, the humidity information, the illuminance information, the noise information, and the sound information.

Moreover, the terminal 100 may communicate with the server 200. For example, the terminal 100 may transmit the obtained location information and time information to the server 200. Also, the terminal 100 may receive situation-adaptive information from the server 200. The situation-adaptive information may be information which is determined as necessary for the user in a situation of the user which has been predicted at a time when the location information and the time information are obtained. Here, the information determined as necessary for the user may be determined based on state information of the terminal 100 or profile information of the user stored in the terminal 100. A detailed embodiment of the situation-adaptive information will be described in detail with reference to FIG. 2.

The terminal 100 may be implemented as various types. For example, the terminal 100 described herein may be a portable phone, a smartphone, a notebook computer (a laptop computer), a tablet personal computer (PC), an e-book terminal, a digital broadcast terminal, a personal digital assistant (PDA), a portable multimedia player (PMP), a navigation, an MP3 player, a digital camera, or the like, but is not limited thereto.

The server 200 may communicate with the terminal 100. The server 200 may receive the location information and the time information from the terminal 100. Also, the server 200 may transmit information, generated based on the obtained location information and time information, to the terminal 100.

According to another embodiment, the server 200 may predict a location at which the terminal 100 is located, based on various pieces of information sensed from the sensor of the terminal 100. In detail, the server 200 may predict the location at which the terminal 100 is located, based on the geographic information, the weather information, the temperature information, the humidity information, the illuminance information, the noise information, and the sound information obtained from the terminal 100.

Information capable of being generated by the server 200 based on the location information and the time information will be described in detail with reference to FIG. 5.

The server 200 may store pieces of information obtained from the terminal 100. Also, the server 200 may classify the stored pieces of information according to a predetermined criterion. The pieces of information obtained from the terminal 100 may include a tag that enables a location or a time to be checked. The server 200 may form a pattern for repeatedly obtained pieces of information among the obtained pieces of information, based on the tag included in the pieces of information obtained from the terminal 100.

Moreover, the server 200 may communicate with other terminals in addition to the terminal 100. The server 200 may store pieces of information obtained from a plurality of terminals and may classify the stored pieces of information according to the predetermined criterion. Similarly to classifying the pieces of information obtained from the terminal 100, the server 200 may be form a pattern for the pieces of information obtained from the plurality of terminals, based on a tag included in the pieces of information obtained from the plurality of terminals.

Hereinafter, an operation where the terminal 100 obtains situation-adaptive information from the server 200 based on obtained location information, time information, and state information will be described in detail with reference to FIG. 2.

Figure 2:
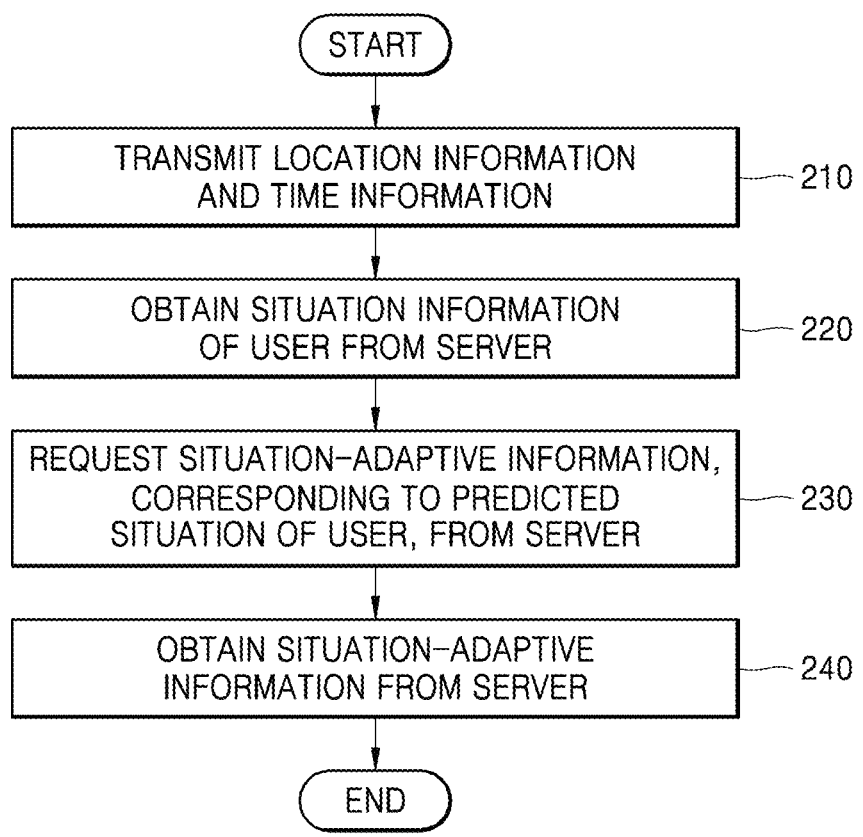
FIG. 2 is a flowchart for describing a method of providing, by a terminal, user-customized information, according to an embodiment of the disclosed invention.

FIG. 2 is a flowchart for describing a method of providing, by the terminal 100, user-customized information, according to an embodiment of the disclosed invention.

In operation 210, the terminal 100 may transmit location information about a location, at which the terminal 100 is located, and time information about a time, when the location information is obtained, to the server 200.

The terminal 100 according to an embodiment of the disclosed invention may obtain the location information, based on information about an ambient environment obtained from the at least one sensor. For example, by using a position sensor (for example, a global positioning system (GPS)), the terminal 100 may obtain information indicating that the terminal 100 is located in an A building. Also, the terminal 100 may obtain geographic information and more detailed location information indicating that the terminal 100 is located in the A building, based on illuminance information obtained from an RGB sensor and temperature information obtained from a temperature sensor. Furthermore, the terminal 100 may obtain the more detailed location information by using one or more sensors such as a humidity sensor and a microphone, in addition to the position sensor, the RGB sensor, and the temperature sensor.

Moreover, the terminal 100 may obtain time information indicating that the terminal 100 is located in the A building at 10:00 on Wednesday. The terminal 100 may transmit the location information and the time information, indicating the terminal 100 is located in the A building at 10:00 on Wednesday, to the server 200.

Hereinafter, a method of determining a location, at which the terminal 100 is located, based on information about an ambient environment obtained by the terminal 100 will be described with reference to FIG. 4.

Figure 4:
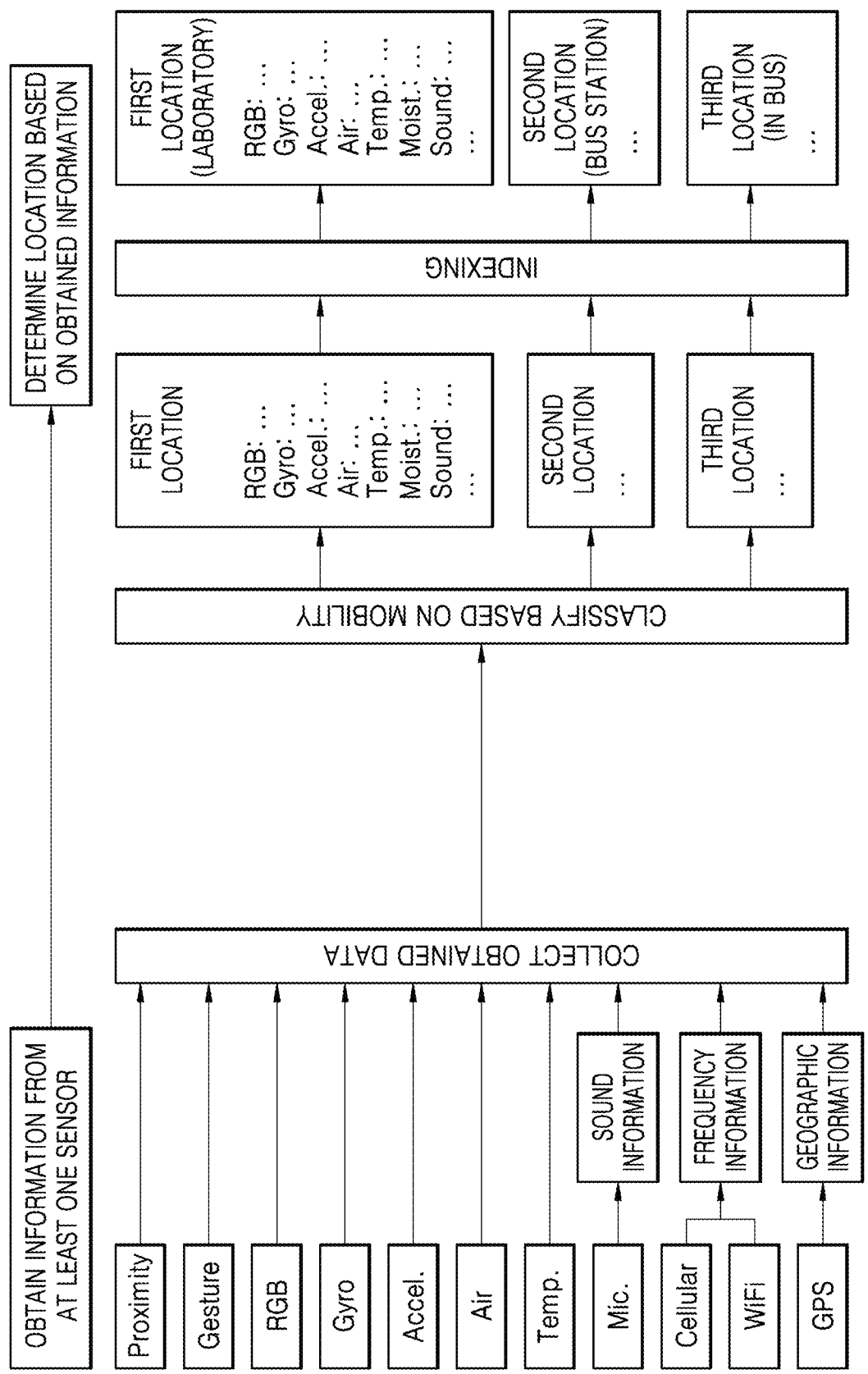
FIG. 4 is a diagram for describing a method of obtaining, by a terminal, information about a location at which the terminal 100 is located, based on information about an ambient environment, according to an embodiment of the disclosed invention.

FIG. 4 is a diagram for describing a method of obtaining, by the terminal 100, information about a location at which the terminal 100 is located, based on information about an ambient environment, according to an embodiment of the disclosed invention.

Referring to FIG. 4, the terminal 100 may include at least one sensor. For example, the terminal 100 may include a proximity sensor, a gesture sensor, an RGB sensor (an illuminance sensor), a gyroscope sensor, an acceleration sensor, a humidity sensor, a temperature sensor, a microphone, a Wi-Fi sensor, a cellular sensor, and a position sensor (e.g., a GPS), but is not limited thereto. Functions of the sensors may be intuitively inferred from names thereof by those of ordinary skill in the art, and thus, their detailed descriptions are omitted.

The terminal 100 may obtain ambient environment information by using the at least one sensor. Also, the terminal 100 may obtain location information about a location at which the terminal 100 is located, based on the obtained ambient environment information.

The terminal 100 may classify the obtained ambient environment information according to a predetermined criterion to obtain information about the location at which the terminal 100 is located. For example, the terminal 100 may classify the ambient environment information obtained from the at least one sensor, based on mobility. When geographic information obtained from the position sensor changes continuously, the server 200 may check that the terminal 100 is moving. Also, based on a rate at which the geographic information changes with time, the terminal 100 may obtain detailed information indicating whether a user is walking or is moving by vehicle.

For example, the terminal 100 may classify the obtained ambient environment information into first and second locations, at which a location of the terminal 100 does not change, and a third location at which the location of the terminal 100 changes, based on the mobility. Also, the terminal 100 may obtain information indicating that the third location is in a car or a bus, based a location change rate of the terminal 100.

This is merely an embodiment of the disclosed invention, and the terminal 100 may classify the location information about the location at which the terminal 100 is located, based on geographic information, weather information, temperature information, humidity information, illuminance information, noise information, and sound information in addition to the mobility.

Hereinafter, an embodiment where the terminal 100 classifies ambient information obtained based on mobility and then obtains detailed location information of the terminal 100 will be described.

As a result obtained by analyzing ambient environment information collected about the first location, the terminal 100 may predict the first location as a laboratory, based on information about where the first location is in a Z research institute based on GPS information, illuminance is low, and a level of noise is low.

Moreover, as a result obtained by analyzing ambient environment information collected about the second location, the terminal 100 may predict the second location as a bus station, based on GPS information about the second location, information indicating that ambient sound is large, information indicating that a temperature is low, and information indicating that the terminal 100 does not move.

Moreover, as a result obtained by analyzing ambient environment information collected about the third location, the terminal 100 may predict the third location as being in a bus, based on GPS information about the third location, information indicating that a temperature is high, information indicating that the terminal 100 is moving at a high speed.

When an operation of predicting a location at which the terminal 100 is located is completed based on the ambient environment, the terminal 100 may generate location index information indicating location information.

According to another embodiment, the server 200 may obtain location information about a location, at which the terminal 100 is located, from ambient environment information obtained by the terminal 100. A method of obtaining location information about a location, at which the terminal 100 is located, from ambient environment information obtained by the terminal 100 may correspond to a method of obtaining, by the terminal 100, location information from ambient environment information.

Referring again to FIG. 2, in operation 220, the terminal 100 may obtain situation information of the user of the terminal 100, predicted based on the location information and the time information, from the server 200. Here, the situation information may be information about a situation of the user when the location information and the time information of the terminal 100 are obtained.

For example, the server 200 may predict a situation where the user is working at a company, based on time information and location information indicating that the terminal 100 is located in the A building at 10:00 on Wednesday. The server 200 may store at least one piece of location information and time information of the terminal 100 obtained from the terminal 100 based on a predetermined period. The server 200 may extract information, indicating that the A building is the company at which the user goes to work every day, and information indicating that 10 a.m. is a working time, based on the stored at least one piece of location information and time information and may predict a situation where the user is working.

The terminal 100 may receive situation information, indicating a situation where the user is working, from the server 200.

In operation 230, the terminal 100 may request situation-adaptive information corresponding to a situation of the user from the server 200, based on the obtained situation information of the user, pre-stored profile information of the user, and state information of the terminal 100 at a time when the location information is obtained. The situation-adaptive information may be information determined as necessary for the user in the situation of the user which is predicted at a time when the location information and the time information are obtained.

Here, the profile information of the user may include information indicating features of the user such as job, family relationship, age, sex, address, hobby, and schedule of the user. The state information of the terminal 100 may include mode information (for example, a sound mode, a vibration mode, a silent mode, a power saving mode, a cutoff mode, a multi-window mode, an automatic rotation mode, etc.) of the terminal 100, activation information (for example, WiFi ON/Bluetooth OFF/GPS ON/NFC ONP) of a communication module, network access state information of the terminal 100, application information (for example, application identification information, a kind of an application, an application use time, and an application use period) executed by the terminal 100, etc., but is not limited thereto.

Herein, an application denotes a set of a series of computer programs for performing a specific operation. Various applications may be described herein. For example, the various applications may include a game application, a video reproduction application, a map application, a memo application, a calendar application, a phone-book application, a broadcast application, an exercise support application, a payment application, a photograph folder application, etc., but are not limited thereto.

The terminal 100 may obtain state information indicating that a currently executed application is a tasty restaurant recommendation application and keywords which are used by the user in a web server represent a B tasty restaurant.

For example, the terminal 100 may check a situation where the user has searched for a tasty restaurant recommendation application in the A building at 10:00 and the user is preparing for a meeting with a client, based on memo information which indicates the meeting with the client and is stored in the calendar application.

The terminal 100 may predict an intention of the user in the situation of the user, based on the state information of the terminal 100. That is, the terminal 100 may predict the intention of the user indicating that the user is preparing for the meeting with the client, based on the state information of the terminal 100. Therefore, the terminal 100 may request situation-adaptive information, determined as necessary for the user in such a situation, from the server 200. The terminal 100 may generate a query from which the situation-adaptive information is capable of being extracted, and may transmit the query to the server 200.

In operation 240, the terminal 100 may obtain the situation-adaptive information from the server 200. The terminal 100 may obtain the situation-adaptive information as a response to the query which has been transmitted for extracting the situation-adaptive information.

The terminal 100 may control an operation of the terminal 100, based on the obtained situation-adaptive information. For example, when the terminal 100 receives situation-adaptive information about the B restaurant which is silent and clear and is near the A building, the terminal 100 may display information about the B restaurant on a screen of the terminal 100.

The terminal 100 according to an embodiment of the disclosed invention may provide the user with a user interface that displays the situation-adaptive information obtained from the server 200.

Figure 3:
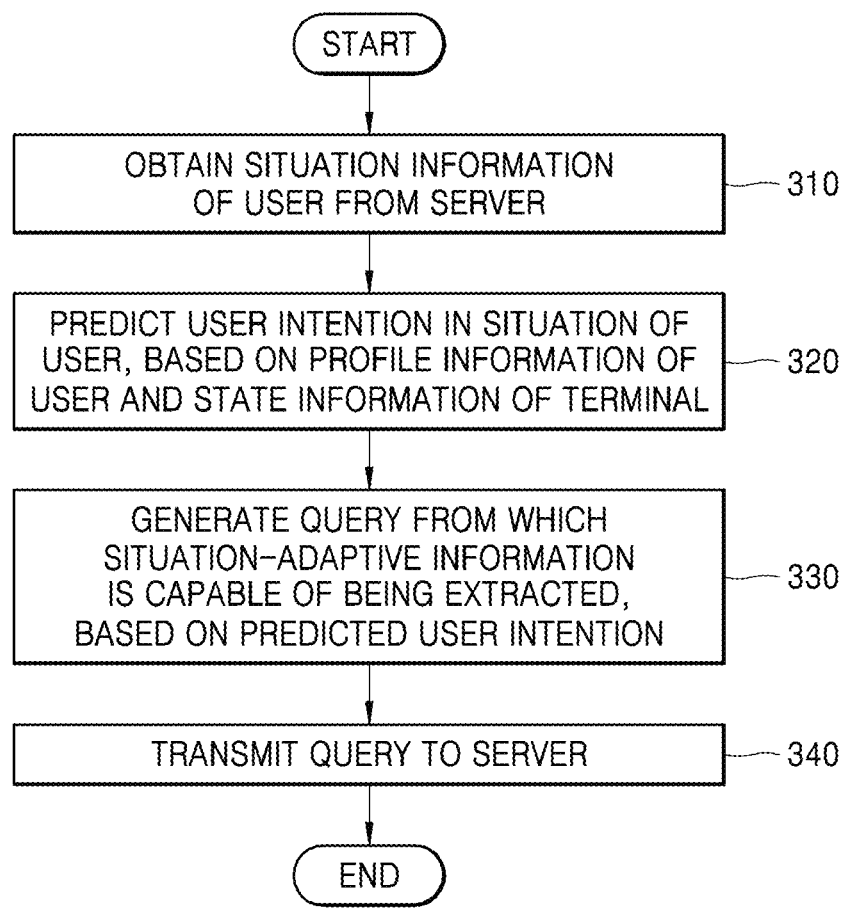
FIG. 3 is a flowchart for describing a method of requesting, by a terminal, situation-adaptive information from a server, according to an embodiment of the disclosed invention.

FIG. 3 is a flowchart for describing a method of requesting, by the terminal 100, situation-adaptive information from the server 200, according to an embodiment of the disclosed invention.

In operation 310, the terminal 100 may obtain situation information of the user of the terminal 100, predicted based on location information and time information, from the server 200. Here, the situation information may be information about a situation of the user when the location information and the time information of the terminal 100 are obtained.

Operation 310 of FIG. 3 may correspond to operation 220 of FIG. 2.

In operation 320, the terminal 100 may predict an intention of the user in a situation of the user, based on profile information of the user and state information of the terminal 100.

For example, the terminal 100 may receive, from the server 200, situation information indicating a situation where the user is waiting for a bus for going to a private educational institute, based on time information and location information indicating that the user is located at a bus station in front of a B building at 1 p.m. on Sunday. The server 200 may store at least one piece of location information, which has been obtained from the terminal 100 during a predetermined period, and pieces of time information at a time when the at least one piece of location information is obtained. The server 200 may predict a situation where the user is waiting for the bus for going to the private educational institute, based on stored experiential information.

The terminal 100 may predict a user intention indicating that the user is checking information about a time taken in going to the private educational institute, based on state information of the terminal 100 indicating that a bus line search application is being executed.

In operation 330, the terminal 100 may generate a query from which situation-adaptive information is capable of being extracted, based on the predicted user intention.

In the above-described embodiment, the terminal 100 may request information about the time, taken in moving to a destination, as the situation-adaptive information from the server 200. The terminal 100 may generate a query for extracting the information about the time taken in moving to the destination. The terminal 100 may generate the query in a processible form. For example, the terminal 100 may generate keywords, including information that is a time taken in moving to a destination, in a form processible by the terminal 100 and the server 200.

In the embodiment described above with reference to FIG. 2, the terminal 100 may generate a more detailed query, based on profile information of the user or state information of the terminal 100. For example, if a fact where the user visited the B restaurant for keeping a promise with the same customer in the past is stored in a memo application or a schedule application of the terminal 100, the terminal 100 may set a limitation for ruling out of the B restaurant in generating a query that requests information about restaurants which are silent and clear and are near the A building. The terminal 100 according to an embodiment of the disclosed invention may predict situation-adaptive information necessary for the user in more detail, based on information about individual users.

In operation 340, the terminal 100 may transmit the generated query to the server 200.

The terminal 100 may transmit the keywords, generated in the form processible by the terminal 100 and the server 200, to the server 200. For example, the terminal 100 may generate keywords, including information that is a time taken in moving to a destination, to the server 200.

Figure 5:
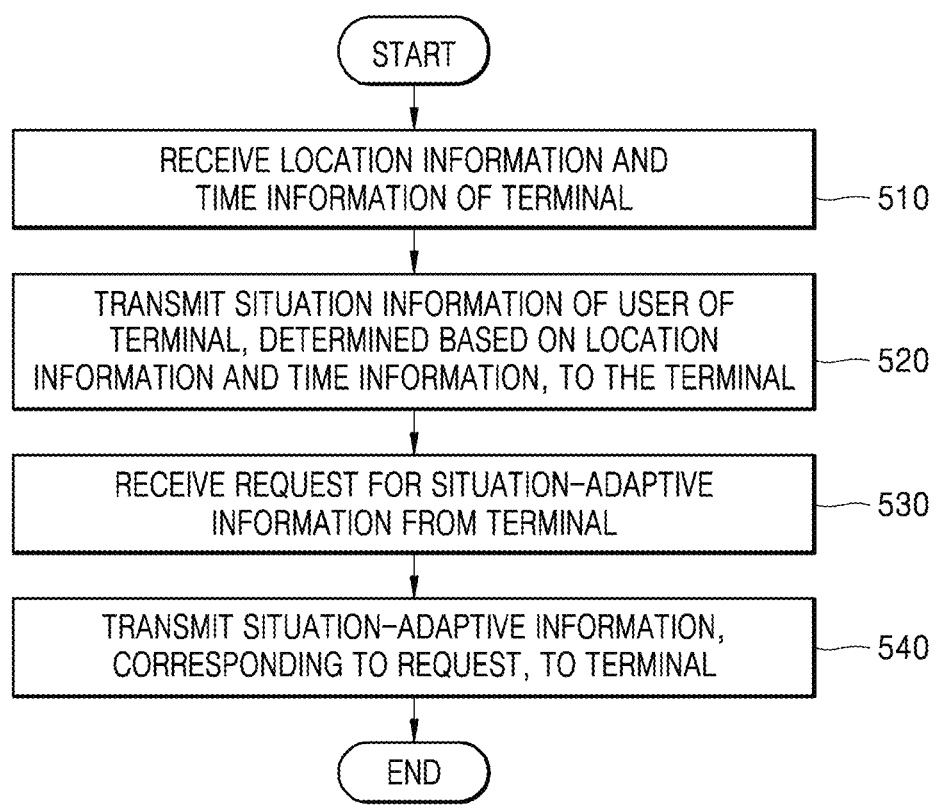
FIG. 5 is a flowchart for describing a method of providing, by a server, user-customized information, according to an embodiment of the disclosed invention.

FIG. 5 is a flowchart for describing a method of providing, by the server 200, user-customized information, according to an embodiment of the disclosed invention.

In operation 510, the server 200 may receive location information about a location at which the terminal 100 is located and time information about a time, when the location information is obtained, from the terminal 100. Here, the location information may be information about the location at which the terminal 100 is located. The location information may be determined based on geographic information, weather information, temperature information, humidity information, illuminance information, noise information, sound information, and/or the like obtained from the sensor of the terminal 100. The server 200 may receive the location information and time information about a time when the terminal 100 obtains the location information. The time information may include time information about a time when at least one of the geographic information, the weather information, the temperature information, the humidity information, the illuminance information, the noise information, and the sound information is obtained from the sensor of the terminal 100.

The server 200 may receive location information of at least one other terminal and time information about a time, when the location information is obtained, from the at least one other terminal. The server 200 may store location information and time information obtained from each of a plurality of terminals.

In operation 520, the server 200 may transmit situation information of the user of the terminal 100, determined based on the location information and the time information obtained from the terminal 100, to the terminal 100.

The server 200 may compare the location information and the time information with pre-stored information of a user database to predict a situation of the user of the terminal 100. Here, the user database may store at least one piece of past location information of the terminal 100 which the server 200 has previously obtained from the terminal 100 and at least one piece of past time information corresponding to the at least one piece of past location information. Also, the database of the server 200 may store information about a query for obtaining situation-adaptive information which has been received from the terminal 100 when the past location information and the past time information are obtained. Also, the database of the server 200 may store the profile information of the user.

The at least one piece of past location information of the terminal 100 may include information about at least one location at which the terminal 100 was located in the past. The at least one piece of past time information of the terminal 100 may include information about a time when at least one piece of location information of the terminal 100 is previously obtained.

If information matching currently obtained location information and time information of the terminal 100 is stored in the user database, the terminal 100 may predict a situation of the user, based on the information.

For example, the server 200 may check a situation where the user is located in the bus station in front of the B building at 1 p.m., based on location information and time information currently obtained from the terminal 100. If past location information, past time information, and past state information respectively matching currently obtained location information, time information, and state information are stored in the server 200 as a result obtained by searching the user database, the server 200 may predict a current situation as being the same as a situation determined in the past. For example, if there is a situation where the user was waiting for the bus at the bus station in front of the B building for going to the private educational institute at 1 p.m. in the past, the server 200 may predict a current situation as a situation where the user is waiting for the bus for going to the private educational institute, based on the situation.

According to another embodiment, the server 200 may generate a user database, based on location information of the terminal 100 obtained from the terminal 100 during a predetermined period, time information of the terminal 100 obtained from the terminal 100 during the predetermined period, and state information of the terminal 100 obtained from the terminal 100 during the predetermined period.

The user database may store information obtained by classifying pieces of information which are obtained by the server 200 during the predetermined period, based on at least one period. For example, the server 200 may classify a location, which the user has visited, by a day unit, a month unit, a year unit, etc. Also, if there is a difference in time despite the same location, the server 200 may differently predict situations of the user.

For example, even in a case where the user visits the same C building, the user may visit a sports center in the C building in the morning and may visit a pub in the C building in the afternoon. The server 200 may predict a situation of the user in more detail in consideration of location information and time information.

In operation 530, the server 200 may receive a request for situation-adaptive information corresponding to a situation of the user from the terminal 100. The situation-adaptive information may be information determined as necessary for the user in a situation of the user predicted at a time when the location information and the time information are obtained. Here, the information determined as necessary for the user may be determined based on state information of the terminal 100 or profile information of the user stored in the terminal 100.

The terminal 100 may generate a query from which the situation-adaptive information is capable of being extracted, and may transmit the query to the server 200. Here, the query may include keywords which are generated in a form processible by the terminal 100 and the server 200.

In operation 540, the server 200 may transmit situation-adaptive information, extracted from situation pattern information obtained by classifying, based on a predetermined time interval, at least one piece of location information obtained from the terminal 100 and time information about a time when the at least one piece of location information is obtained, to the terminal 100. The situation pattern information may include location information preferred by the user and time information about a time when the user is located at a preferred location, based on collected location information and time information. The server 200 may provide the user with situation-adaptive information as well as the situation pattern information stored in the user database, based on information obtained from an external device (for example, a web server).

For example, according to the embodiment described above with reference to FIG. 2, when the terminal 100 transmits a query about whether there is a restaurant, which is silent and clear and is near the A building, to the server 200, the server 200 may transmit situation-adaptive information corresponding to the query to the terminal 100.

In detail, the server 200 may extract a restaurant, which is preferred by the user and is near the A building, from situation pattern information generated based on location information and time information which are obtained from the terminal 100 during a predetermined period. For example, the server 200 may detect a type of a restaurant, which the user prefers, from restaurant information which is stored in the user database and frequently visited by the user. The server 200 may transmit information about restaurants, having a type similar to a type of a restaurant detected from among several restaurants near the A building, as situation-adaptive information corresponding to a query to the terminal 100.

As another example, when it is checked that the user is located in the C building at 10 p.m., the server 200 may predict a situation where the user is drinking at a pub, based on location information and time information. The terminal 100 may request information about a chauffeur service phone number, determined as necessary for the user, as situation-adaptive information from the server 200, based on situation information received from the server 200. In this case, the terminal 100 may transmit a query, consisting of keywords including details which request chauffeur service information, to the server 200. At this time, the server 200 may extract chauffeur service information, which is frequently used by the user, from the web server or the user database and may transmit the chauffeur service information as situation-adaptive information to the terminal 100.

The server 200 may transmit situation-adaptive information to the user, based on location information and time information of at least one other terminal obtained from the at least one other terminal.

For example, when the server 200 predicts a situation where the user is located at a cinema of a D building at 8 p.m., based on location information and state information of the terminal 100, the terminal 100 may request situation-adaptive information from the server 200, based on current state information of the terminal 100. For example, the terminal 100 may generate a query about whether to change a mode of the terminal 100 to a vibration mode, based on state information indicating that a notification mode of the terminal 100 is a bell sound mode currently and may transmit the query to the server 200.

In response to the transmitted query, the server 200 may transmit situation-adaptive information, indicating that the notification mode should be changed to the vibration mode, to the terminal 100, based on information indicating that a notification mode of at least one terminal which is located at the same time and location as the terminal 100 is the vibration mode. The terminal 100 may change the notification mode of the terminal 100 to the vibration mode, based on the situation-adaptive information received from the server 200.

Figure 6:
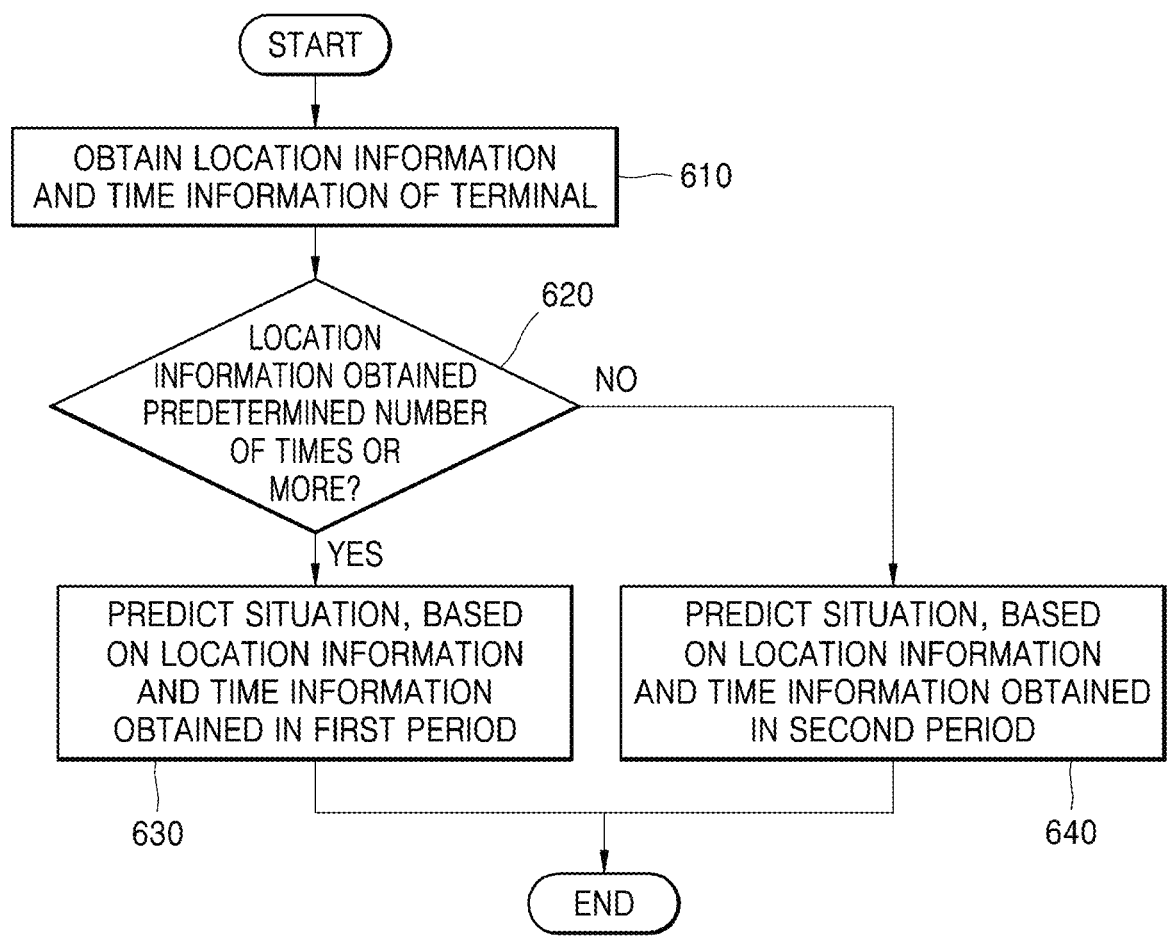
FIG. 6 is a flowchart for describing a detailed method of predicting, by a server, a situation of a user, based on location information and time information, according to an embodiment of the disclosed invention.

FIG. 6 is a flowchart for describing a detailed method of predicting, by the server 200, a situation of a user, based on location information and time information, according to an embodiment of the disclosed invention.

In operation 610, the server 200 may receive location information and time information of the terminal 100. Here, the location information may be information about the location at which the terminal 100 is located. Also, the server 200 may receive the location information and the time information about a time, when the terminal 100 obtains the location information.

Operation 610 of FIG. 6 may correspond to operation 510 of FIG. 5.

In operation 620, the server 200 may determine whether location information obtained from the terminal 100 matches pieces of location information which have been previously obtained a predetermined number of times or more. Since situations of the user differ depending on a location which the user frequently visits, before predicting a situation of the user, the server 200 may determine a location at which the terminal 100 is currently located is a location which the user frequently visits.

In operation 630, the server 200 may predict the situation of the user, based on state information of the terminal 100, located at a first location at which the terminal 100 is currently located and was located the predetermined number of times or more, which has been obtained in a first period before a time when location information of the terminal 100 is obtained.

For example, if a location at which the terminal 100 is currently located is a workplace of the user at which the user is located the predetermined number of times or more, the server 200 may predict the situation of the user, based on the state information of the user 100 which has been obtained for one day before a time when current location information is obtained.

In operation 640, the server 200 may predict the situation of the user, based on state information of the terminal 100, located at a second location at which the terminal 100 is currently located and was located less than the predetermined number of times or more, which has been obtained in a second period before a time when second location information of the terminal 100 is obtained.

For example, if a location at which the terminal 100 is currently located is a resort at which the user was located less than the predetermined number of times, the server 200 may predict the situation of the user, based on the state information of the user 100 which has been obtained for one week before a time when the user visited the resort in the past.

Here, the first period may be set as a period which is relatively shorter than the second period. This is merely an embodiment of the disclosed invention, and the disclosed invention is not limited thereto.

Figure 7:
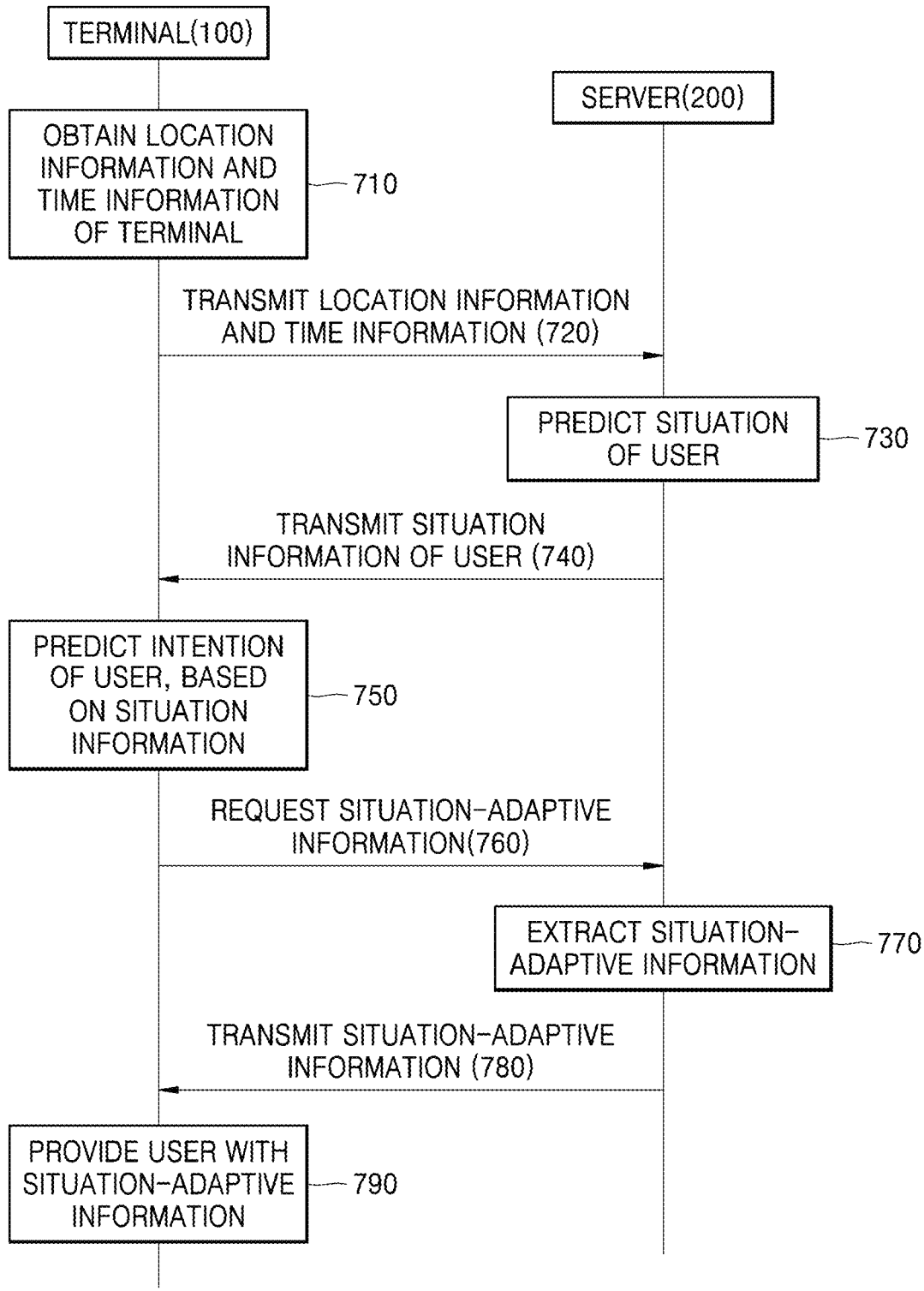
FIG. 7 is a flowchart for describing a method of providing, by a terminal and a server, user-customized information, according to an embodiment of the disclosed invention.

FIG. 7 is a flowchart for describing a method of providing, by the terminal 100 and the server 200, user-customized information, according to an embodiment of the disclosed invention.

In operation 710, the terminal 100 may obtain location information about a location, at which the terminal 100 is located, and time information about a time when the location information is obtained.

In operation 720, the terminal 100 may transmit the obtained location information and time information to the server 200.

In operation 730, the server 200 may predict a situation of the user, based on the location information and the time information obtained from the terminal 100.

In operation 740, the server 200 may transmit situation information of the user, including information about the predicted situation of the user, to the terminal 100. Here, the situation information may be information about a situation of the user when the location information and the time information of the terminal 100 are obtained.

In operation 750, the terminal 100 may predict an intention of the user, based on the situation information of the user received from the server 200.

In operation 760, the terminal 100 may request situation-adaptive information from the server 200, based on the predicted intention of the user. The terminal 100 may generate a query including keywords from which the situation-adaptive information is capable of being extracted, and may transmit the query to the server 200. Here, the situation-adaptive information may be information which is determined as necessary for the user as a result based on the intention of the user in the situation of the user which is predicted at a time when the location information and the time information are obtained.

In operation 770, the server 200 may extract the situation-adaptive information, corresponding to the request received from the terminal 100, from the user database. The user database may store information obtained by classifying pieces of information which are obtained by the server 200 during a predetermined period.

In operation 780, the server 200 may transmit the situation-adaptive information, extracted from the user database, to the terminal 100.

In operation 790, the terminal 100 may provide the user with the situation-adaptive information received from the server 200. Here, the terminal 100 may display the situation-adaptive information on a screen of the terminal 100 in order for the user to see and read the situation-adaptive information, or may change a state of the terminal 100, based on the situation-adaptive information.

Figure 8:
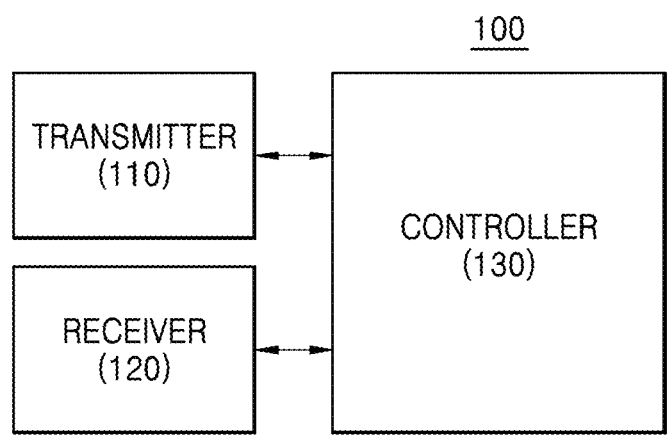
FIGS. 8 and 9 are block diagrams of a terminal for providing user-customized information, according to an embodiment of the disclosed invention.
Figure 9:
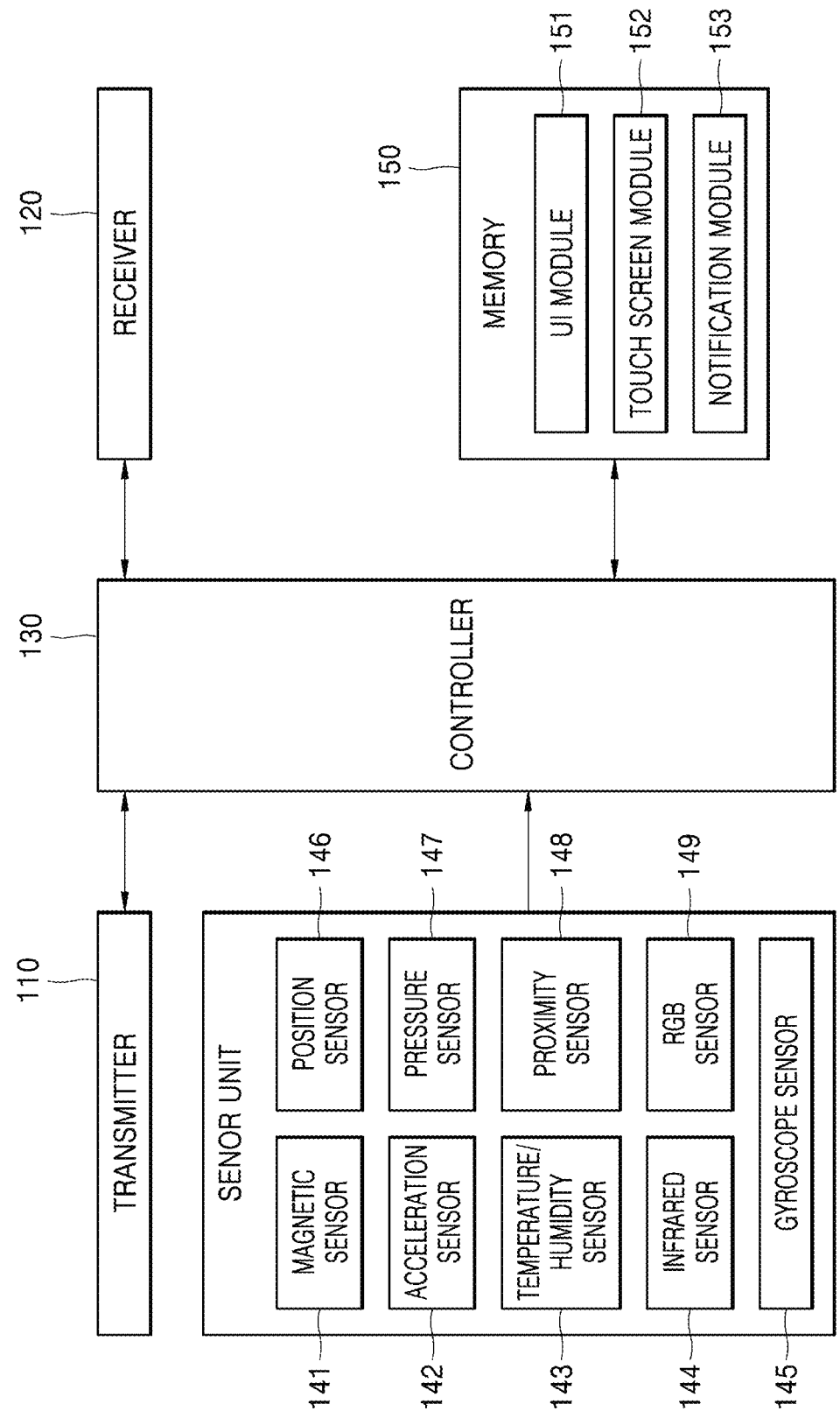

FIGS. 8 and 9 are block diagrams of a terminal 100 for providing user-customized information, according to an embodiment of the disclosed invention.

As illustrated in FIG. 8, the terminal 100 according to an embodiment of the disclosed invention may include a transmitter 110, a receiver 120, and a controller 130. However, only some of the elements are essential elements. The terminal 100 may include additional elements, in addition to the illustrated elements. Alternatively, the terminal 100 may include less elements than the number of illustrated elements.

For example, the terminal 100 according to an embodiment of the disclosed invention may further include a sensor unit 140 and a memory 150 in addition to the transmitter 110, the receiver 120, and the controller 130.

Hereinafter, the elements will be described in order.

The transmitter 110 may transmit location information about a location, at which the terminal 100 is located, and time information about a time, when the location information is obtained, to the server 200. The controller 130 according to an embodiment of the disclosed invention may obtain the location information, based on ambient environment information obtained from at least one sensor included in the sensor unit 140. The transmitter 110 may transmit the location information obtained from the controller 130 and the time information about the time, when the location information is obtained, to the server 200.

The receiver 120 may obtain situation information of a user of the terminal 100, based on the location information and the time information, from the server 200. Here, the situation information may be information about a situation of the user when the location information and the time information of the user are obtained.

The controller 130 may determine the situation-adaptive information corresponding to the situation of the user, based on the received situation information of the user, pre-stored profile information of the user, and state information of the terminal 100 at a time when the location information is obtained. The transmitter 110 may transmit a request for the situation-adaptive information, generated by the controller 130, to the server 200. The situation-adaptive information may be information determined as necessary for the user in the situation of the user which is predicted at a time when the location information and the time information are obtained.

The controller 130 may predict an intention of the user in the situation of the user, based on the state information of the terminal 100. The controller 130 may predict the user intention in the situation of the user, based on the profile information of the user and the state information of the terminal 100. Therefore, the controller 130 may determine situation-adaptive information necessary for the user in such a situation and may control the transmitter 110 in order for the transmitter 110 to request the situation-adaptive information from the server 200.

In detail, the controller 130 may generate a query from which the situation-adaptive information is capable of being extracted, based on the user intention and may control the transmitter 110 in order for the transmitter 110 to transmit the query to the server 200.

The receiver 120 may obtain the situation-adaptive information from the server 200. The terminal 100 may obtain the situation-adaptive information as a response to the query which has been transmitted for extracting the situation-adaptive information.

The controller 130 may control an operation of the terminal 100, based on the obtained situation-adaptive information.

The sensor unit 140 may include at least one of a magnetic sensor 141, an acceleration sensor 142, a temperature/humidity sensor 143, an infrared sensor 144, a gyroscope sensor 145, a position sensor (e.g., a GPS) 146, a pressure sensor 147, a proximity sensor 148, and an RGB sensor (an illuminance sensor) 149, but is not limited thereto. Functions of the sensors may be intuitively inferred from names thereof by those of ordinary skill in the art, and thus, their detailed descriptions are omitted.

The sensor unit 140 may obtain ambient environment information by using at least one sensor. Also, the terminal 100 may obtain location information about a location at which the terminal 100 is located, based on the obtained ambient environment information. For example, the sensor unit 140 may obtain geographic information, weather information, temperature information, humidity information, illuminance information, noise information, sound information, and/or the like as the ambient environment information about the location at which the terminal 100 is located.

The memory 150 may store a program for processing and control by the control 130 or store pieces of input/output data.

The memory 150 may include at least one type storage medium selected from a flash memory type, a hard disk type, a multimedia card micro type, a card type memory (for example, a micro-secure digital (SD) memory, an extreme digital (xD) memory, or the like), random access memory (RAM), static random access memory (SRAM), read-only memory (ROM), electrically erasable and programmable read-only memory (EEPROM), programmable read-only memory (PROM), a magnetic memory, a magnetic disk, and an optical disk.

The programs stored in the memory 150 may be classified into a plurality of modules depending on functions. For example, the programs may be classified into a user interface (UI) module 151, a touch screen module 152, a notification module 153, and/or the like.

The UI module 151 may provide a UI, a graphic UI (GUI), and/or the like cooperating with the terminal 100 for each of a plurality of applications. The touch screen module 152 may sense a touch gesture of a user applied to the touch screen and transfer information about the touch gesture to the controller 130. The touch screen module 152 according to an exemplary embodiment may recognize and analyze a touch code. The touch screen module 152 may be configured with separate hardware including a controller.

Various sensors may be provided inside or near a touch screen, for detecting a touch or a proximity touch applied to the touch screen. A device according to the disclosed invention may include a processor, a memory storing and executing program data, a permanent storage such as a disk drive, a communication port for communication with an external device, a user interface device such as a touch panel, keys or buttons, and the like.

Figure 10:
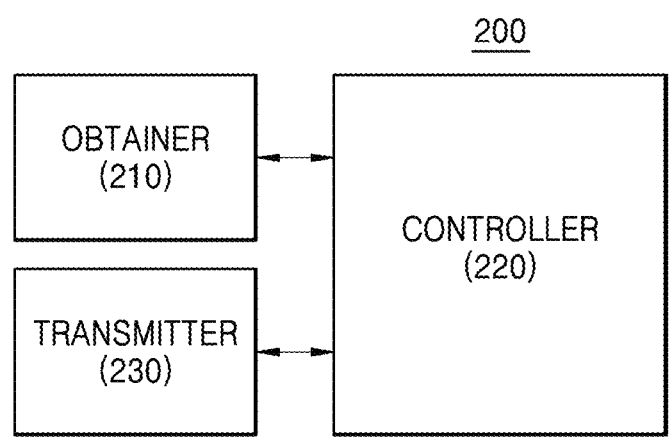
FIG. 10 is a block diagram of a server for providing user-customized information, according to an embodiment of the disclosed invention.

FIG. 10 is a block diagram of a server 200 for providing user-customized information, according to an embodiment of the disclosed invention.

In the server 200 for providing user-customized information illustrated in FIG. 10, only elements relevant to the present embodiment are illustrated. Therefore, it can be understood by those of ordinary skill in the art that the server 200 may further include other general-use elements in addition to the elements illustrated in FIG. 10.

Referring to FIG. 10, the server 200 for providing user-customized information may include an obtainer 210, a controller 220, and a transmitter 230.

The obtainer 210 may receive location information about a location at which the terminal 100 is located and time information about a time, when the location information is obtained, from the terminal 100. Here, the location information may be information about the location at which the terminal 100 is located. The location information may be determined based on geographic information, weather information, temperature information, humidity information, illuminance information, noise information, sound information, and/or the like obtained from the sensor of the terminal 100. The server 200 may receive the location information and time information about a time when the terminal 100 obtains the location information.

The obtainer 210 may receive location information of at least one other terminal and time information about a time, when the location information is obtained, from the at least one other terminal. A memory (not shown) of the server 200 may store location information and time information obtained from each of a plurality of terminals.

The server 200 may predict situation information of a user of the terminal 100, based on the location information and the time information obtained from the terminal 100. The controller 220 may compare the obtained location information and time information with information stored in a user database to predict a situation of the user of the terminal 100. Here, the user database may store at least one piece of past location information of the terminal 100 which the obtainer 210 has previously obtained from the terminal 100 and at least one piece of past time information corresponding to the at least one piece of past location information. Also, the database may store information about a query for obtaining situation-adaptive information which has been received from the terminal 100 when the past location information and the past time information are obtained. Also, the database of the server 200 may store the profile information of the user.

If information matching currently obtained location information and time information of the terminal 100 is stored in the user database, the controller 220 may predict a situation of the user, based on the information.

According to another embodiment, the controller 220 may determine whether location information obtained from the terminal 100 matches pieces of location information which have been previously obtained a predetermined number of times or more. Since situations of the user differ depending on a location which the user frequently visits, before predicting a situation of the user, the controller 220 may determine a location at which the terminal 100 is currently located is a location which the user frequently visits.

According to another embodiment, the controller 220 may generate a user database, based on location information of the terminal 100 obtained from the terminal 100 during a predetermined period, time information of the terminal 100 obtained from the terminal 100 during the predetermined period, and state information of the terminal 100 obtained from the terminal 100 during the predetermined period.

The user database may store information obtained by classifying pieces of information which are obtained by the obtainer 210 during the predetermined period, based on at least one period. For example, the controller 220 may classify a location, which the user has visited, by a day unit, a month unit, a year unit, etc. Also, if there is a difference in time despite the same location, the controller 220 may differently predict situations of the user.

The transmitter 230 may transmit the predicted situation information of the user of the terminal 100 to the terminal 100. The situation-adaptive information may be information determined as necessary for the user in a situation of the user predicted at a time when the location information and the time information are obtained. Here, the information determined as necessary for the user may be determined based on state information of the terminal 100 or profile information of the user stored in the terminal 100.

The obtainer 210 may receive a request for situation-adaptive information corresponding to a situation of the user from the terminal 100. The obtainer 210 may receive a query, from which the situation-adaptive information is capable of being extracted, from the terminal 100. Here, the query may include keywords which are generated in a form processible by the terminal 100 and the controller 220 of the server 200.

The controller 220 may extract situation-adaptive information, extracted from situation pattern information obtained by classifying, based on a predetermined time interval, at least one piece of location information obtained from the terminal 100 and time information about a time when the at least one piece of location information is obtained, to the terminal 100.

The transmitter 230 may transmit the extracted situation-adaptive information to the terminal 100.

According to another embodiment, the controller 220 may extract situation-adaptive information of the terminal 100, based on location information and time information of at least one other terminal obtained from the at least one other terminal.

A device according to an exemplary embodiment may include a processor, a memory storing and executing program data, a permanent storage such as a disk drive, a communication port for communication with an external device, a user interface device such as a touch panel, keys or buttons, and the like. Methods embodied as a software module or an algorithm may be stored on a non-transitory computer-readable recording medium as computer readable codes or program commands executable by the processor. Examples of the non-transitory computer-readable recording medium include magnetic storage media (e.g., ROM, floppy disks, hard disks, etc.), optical recording media (e.g., CD-ROMs, or DVDs), and the like. The non-transitory computer-readable recording medium may also be distributed over network-coupled computer systems so that the computer readable code is stored and executed in a distributed fashion. The medium may be read by a computer, stored in a memory, and executed by the processor.

All the documents including the public laid open documents, patent applications, patent documents, and the like cited in the inventive concept may be merged into the inventive concept in the same manner as that indicated by individually or specifically merging the respective cited documents or as that indicated by merging them overall in the inventive concept.

To aid in understanding the inventive concept, reference numerals are used in the exemplary embodiments shown in the drawings, and specific terms are used to explain the exemplary embodiments of the inventive concept; however, they are not intended to limit the inventive concept and may represent all the components that could be considered by those of ordinary skill in the art.

The inventive concept may be embodied as functional blocks and various processing operations. The functional blocks may be implemented with various hardware and/or software configurations executing specific functions. For example, the inventive concept employs integrated circuit configurations such as a memory, processing, logic, a look-up table and the like capable of executing various functions upon control of microprocessors or other control devices. In a similar manner to that in which the elements of the inventive concept may be executed with software programming or software elements, the inventive concept may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the inventive concept may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the inventive concept in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements may not be inevitably required elements for the application of the inventive concept unless they are specifically mentioned as being "essential" or "critical."

The invention claimed is:

1. A method of displaying user-customized information by a terminal, the method comprising:
   obtaining location information about a location of the terminal;
   obtaining time information about a time when the location information is obtained;
   obtaining state information of the terminal at the time when the location information is obtained, the state information comprising network access state information of the terminal;
   determining situation-adaptive information based on the location information, the time information and the state information, the situation-adaptive information being information determined for a situation of a user at the time and the location; and
   displaying the situation-adaptive information,
   wherein the displayed situation-adaptive information comprises a time taken in moving to a destination,
   wherein the method further comprises obtaining situation information of the user of the terminal based on the network access state information indicating that, at the time when the location information is obtained, the terminal is connected to a predetermined network, the situation information indicating a user intent to move to the destination at the time when the location information is obtained, and
   wherein the determining of the situation-adaptive information comprises determining the situation-adaptive information based on the situation information, the time information, and the location information.

2. The method of claim 1, wherein the time taken in moving to the destination is determined based at least on the location information.

3. The method of claim 1, wherein the destination is a previously-stored destination and is identified based at least on the time information.

4. The method of claim 1, wherein:
   the location information, the time information and the state information are obtained during a predetermined period,
   wherein the situation information is determined based on a classification result of the location information, the time information and the state information obtained during the predetermined period.

5. The method of claim 1, wherein the determining the situation-adaptive information based on the situation information comprises:
predicting an intention of the user at the time and the location based on the situation information and past user behavior at a corresponding time and a corresponding location; and
determining the situation-adaptive information based on the predicted intention of the user.

6. The method of claim 1, wherein the destination is identified based at least on the time information and the location information.

7. The method of claim 1, wherein the destination is identified based at least on the time information, the location information, and the network access state information indicating that the terminal is connected to the predetermined network.

8. The method of claim 1, wherein the determining the situation-adaptive information comprises:
comparing the time information with previously-stored time information; and
determining, based on the previously-stored time information, previously-stored destination information as the destination.

9. The method of claim 1, wherein:
the obtaining the location information comprises determining the location information of the terminal as that the terminal is in a car and is near a workplace of the user of the terminal;
the state information further comprises application information of the terminal;
the application information of the terminal comprises information of a map application installed on the terminal; and
the network access state information comprises Bluetooth module activation information.

10. A terminal configured to provide user-customized information by a terminal, the terminal comprising:
a memory storing one or more instructions; and
at least one processor configured to execute the one or more instructions stored in the memory, which when executed the at least one processor is configured to:
obtain location information about a location of the terminal;
obtain time information about a time when the location information is obtained;
obtain state information of the terminal at the time when the location information is obtained, the state information comprising network access state information of the terminal;
determine situation-adaptive information based on the location information, the time information and the state information, the situation-adaptive information being information determined for a situation of a user at the time and the location; and
control to display the situation-adaptive information,
wherein the displayed situation-adaptive information comprises a time taken in moving to a destination,
wherein the at least one processor when executing the one or more instructions is further configured to:

obtain situation information of the user of the terminal based on the network access state information indicating that, at the time when the location information is obtained, the terminal is connected to a predetermined network, the situation information indicating a user intent to move to the destination at the time when the location information is obtained; and
determine the situation-adaptive information based on the situation information, the time information, and the location information.

11. The terminal of claim 10, wherein the time taken in moving to the destination is determined based at least on the location information.

12. The terminal of claim 11, wherein the destination is a previously-stored destination and is identified based at least on the time information.

13. The terminal of claim 10, wherein:
the location information, the time information and the state information are obtained during a predetermined period,
wherein the situation information is determined based on a classification result of the location information, the time information and the state information obtained during the predetermined period.

14. The terminal of claim 10, wherein the at least one processor when executing the one or more instructions is further configured to:
predict an intention of the user at the time and the location based on the situation information and past user behavior at a corresponding time and the location; and
determine the situation-adaptive information based on the predicted intention of the user.

15. The terminal of claim 10, wherein the destination is identified based at least on the time and the location.

16. The terminal of claim 10, wherein the destination is identified based at least on the time, the location, and the network access state information indicating that the terminal is connected to the predetermined network.

17. The terminal of claim 10, wherein the at least one processor when executing the one or more instructions is further configured to:
compare the time information with previously-stored time information; and
determine, based on the previously-stored time information, previously-stored destination information as the destination.

18. The terminal of claim 10, wherein:
the at least one processor when executing the one or more instructions is further configured to determine the location information of the terminal as that the terminal is in a car and is near a workplace of the user of the terminal;
the state information further comprises application information of the terminal;
the application information of the terminal comprises information of a map application installed on the terminal; and
the network access state information comprises Bluetooth module activation information.

\* \* \* \* \*